(12) United States Patent
Solomon (10) Patent No.: US 9,148,004 B1
(45) Date of Patent: Sep. 29, 2015

(54) ELECTRICAL BOX MARKING SYSTEM (71) Applicant: Richard K. Solomon, Silverthorne, CO (US)

(72) Inventor: Richard K. Solomon, Silverthorne, CO (US)

(*) Notice: Subject to any disclaimer, the term of this patent is extended or adjusted under 35 U.S.C. 154(b) by 115 days.

(21) Appl. No.: 13/954,603

(22) Filed: Jul. 30, 2013

Related U.S. Application Data (60) Provisional application No. 61/677,255, filed on Jul. 30, 2012.

(51) Int. Cl.
*G01B 5/14* (2006.01)
*H02G 3/12* (2006.01)

(52) U.S. Cl.
CPC ... *H02G 3/12* (2013.01); *G01B 5/14* (2013.01)

(58) Field of Classification Search
CPC ............. H02G 1/00; H02G 3/12; H02G 7/04; B25H 7/04; B25H 7/00; B25H 7/02
USPC ............................................. 33/528, DIG. 10
See application file for complete search history.

(56) References Cited

U.S. PATENT DOCUMENTS

| | | | |
|---|---|---|---|
| 2,898,688 A * | 8/1959 | Cottar | 33/528 |
| 3,636,236 A | 1/1972 | Smith | |
| 3,888,013 A * | 6/1975 | Benoit | 33/528 |
| 4,202,457 A | 5/1980 | Tansi | |
| 4,850,115 A | 7/1989 | Price et al. | |
| 4,922,056 A | 5/1990 | Larsson | |
| 4,951,395 A | 8/1990 | Lameiro | |
| 5,177,325 A | 1/1993 | Giammanco | |
| 5,316,165 A | 5/1994 | Moran, Jr. | |
| 5,350,884 A | 9/1994 | Littrell | |
| 5,588,549 A | 12/1996 | Furtner | |
| 5,594,207 A | 1/1997 | Fabian et al. | |
| 5,596,174 A | 1/1997 | Sapienza | |
| 5,630,281 A | 5/1997 | Pledger et al. | |
| 5,639,991 A | 6/1997 | Schuette | |
| 5,659,151 A | 8/1997 | Dale | |
| 5,710,392 A | 1/1998 | Bordwell et al. | |
| 5,744,753 A | 4/1998 | Nattel | |
| 5,841,068 A | 11/1998 | Umstead et al. | |
| 5,981,874 A | 11/1999 | Reiker | |
| 6,229,087 B1 | 5/2001 | Archer | |
| 6,300,567 B1 | 10/2001 | Hayduke et al. | |
| 6,303,862 B1 | 10/2001 | Reiker | |
| 6,307,154 B1 | 10/2001 | Gretz | |
| 6,369,323 B1 | 4/2002 | Wright | |
| 6,395,979 B1 | 5/2002 | English | |
| 6,403,883 B1 | 6/2002 | Morgan et al. | |
| 6,810,598 B2 | 11/2004 | Boys | |
| 6,867,369 B2 | 3/2005 | Wiggins | |
| 6,940,016 B1 | 9/2005 | Cornett et al. | |
| 7,009,110 B1 | 3/2006 | Gretz | |
| D538,752 S | 3/2007 | Kiely | |
| 7,210,241 B1 * | 5/2007 | Bree | 33/528 |

(Continued)

*Primary Examiner* — Yaritza Guadalupe-McCall (57) ABSTRACT

An electrical box marking system for use when installing a sheet of drywall over a mounted electrical box or when masking the electrical box for texturing or painting the sheet of drywall features a structural wall having a stud with a stud face and a stud side. The system features an electrical box located on the stud side. A first projection is located on a box top lip and a second projection is located on a box bottom lip. The box top lip, the box bottom lip, a box first side lip, and a box second side lip project out and away from the stud face by a box projection distance. The system features a sheet of drywall having a front drywall surface, a rear drywall surface, and a drywall thickness.

2 Claims, 5 Drawing Sheets

(56) References Cited

U.S. PATENT DOCUMENTS

| | | | |
|---|---|---|---|
| 7,454,844 B1 * | 11/2008 | Ruby | 33/528 |
| D598,392 S | 8/2009 | Vigorito et al. | |
| D635,099 S | 3/2011 | Kramer | |
| 7,935,887 B2 * | 5/2011 | Petak | 33/528 |
| 7,989,699 B1 * | 8/2011 | Shotey et al. | 33/528 |
| D692,836 S | 11/2013 | Thomas et al. | |
| D700,893 S | 3/2014 | Thomas et al. | |
| 2003/0213801 A1 | 11/2003 | Bradley et al. | |
| 2006/0285278 A1 | 12/2006 | Tankersley | |
| 2009/0194311 A1 | 8/2009 | Merrill | |
| 2011/0239477 A1 * | 10/2011 | Dressel et al. | 33/528 |

* cited by examiner

ELECTRICAL BOX MARKING SYSTEM

CROSS REFERENCE

This application claims priority to U.S. Provisional Application No. 61/677,255, filed Jul. 30, 2012, the specification(s) of which is/are incorporated herein in theft entirety by reference.

FIELD OF THE INVENTION

The present invention relates to electrical boxes, or more specifically, electrical boxes that incorporate drywall marking systems.

BACKGROUND OF THE INVENTION

Electrical boxes are used as a container for electrical connections in an electrical system. A small metal or plastic junction box may be used to mount electrical switches or electrical outlets in or on a building. When installing electrical boxes and drywall, the electrical box is mounted, then the drywall is mounted afterward. A spiral saw may be used to cut a hole in the drywall allowing the electrical box to protrude through the hole for use. Sometimes, however it can be difficult to locate the electrical box for cutting the hole when covered by the drywall.

During construction and wall finishing operations, care must be taken to keep debris, paint or texture material from entering the electrical box. Sometimes, the electrical box is masked using tape as a sealing material, however once the texturing or painting operation is complete, it can be difficult to locate the electrical boxes to remove the tape. The present invention features an electrical box marking system for use when masking an electrical box for texturing or painting drywall.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features an electrical box marking system for use when installing a sheet of drywall over a mounted electrical box or when masking the electrical box for texturing or painting the sheet of drywall. In some embodiments, the system comprises a structural wall having a stud with a stud face and a stud side.

In some embodiments the system comprises an electrical box located on the stud side. In some embodiments, a first projection is located on a box top lip having a first scored line located at the interface of the box top lip and a first projection rear edge. In some embodiments, a second projection is located on a box bottom lip having a second scored line located at the interface of the box bottom lip and a second projection rear edge. In some embodiments, the box top lip, the box bottom lip, a box first side lip, and a box second side lip project out and away from the stud face by a box projection distance.

In some embodiments, the system comprises a sheet of drywall having a front drywall surface, a rear drywall surface, and a drywall thickness.

DESCRIPTION OF PREFERRED EMBODIMENTS

Figure 1:
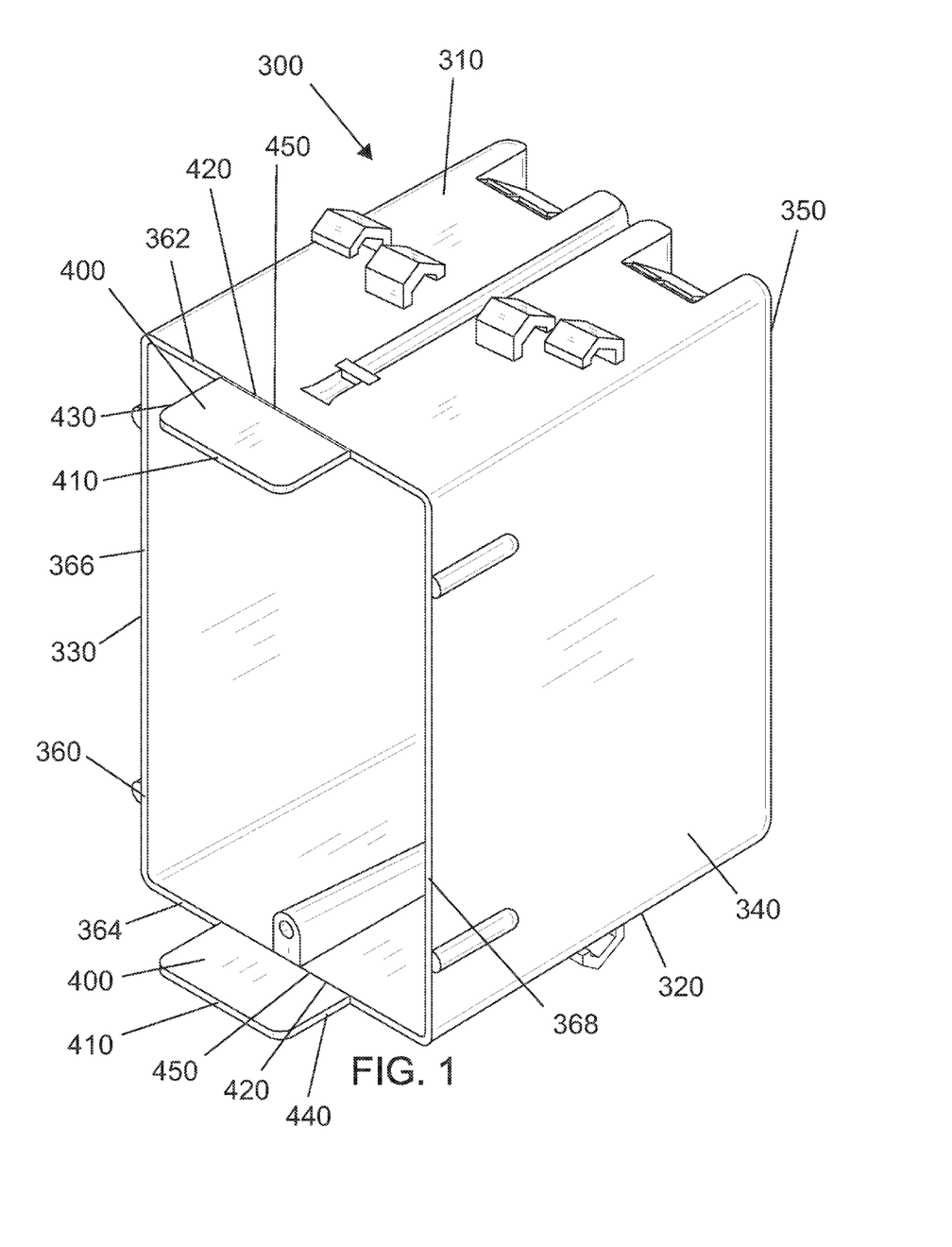
FIG. 1 is a perspective view of the electrical box of the present invention.
Figure 2:
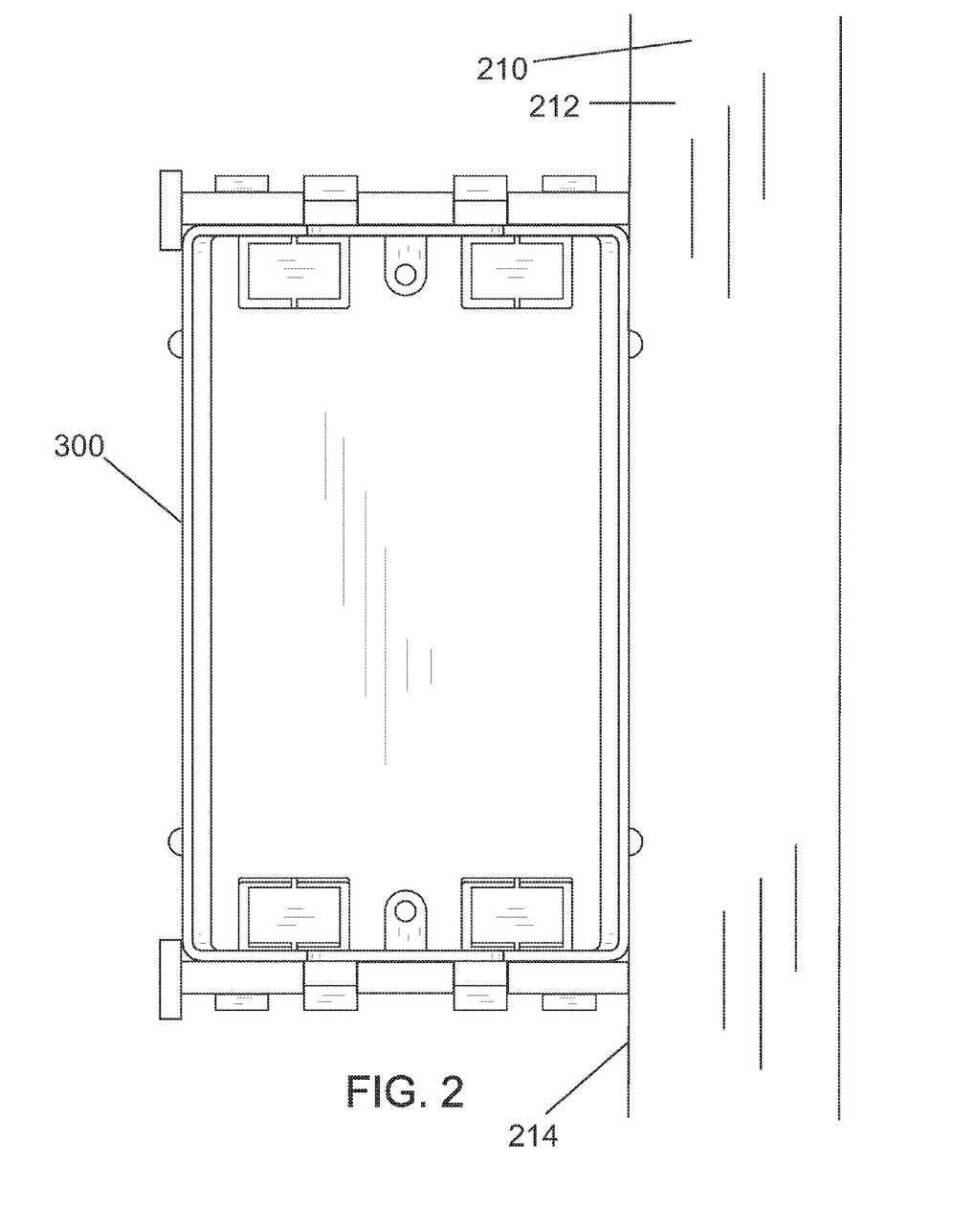
FIG. 2 is a front view of the electrical box of the present invention.
Figure 3:
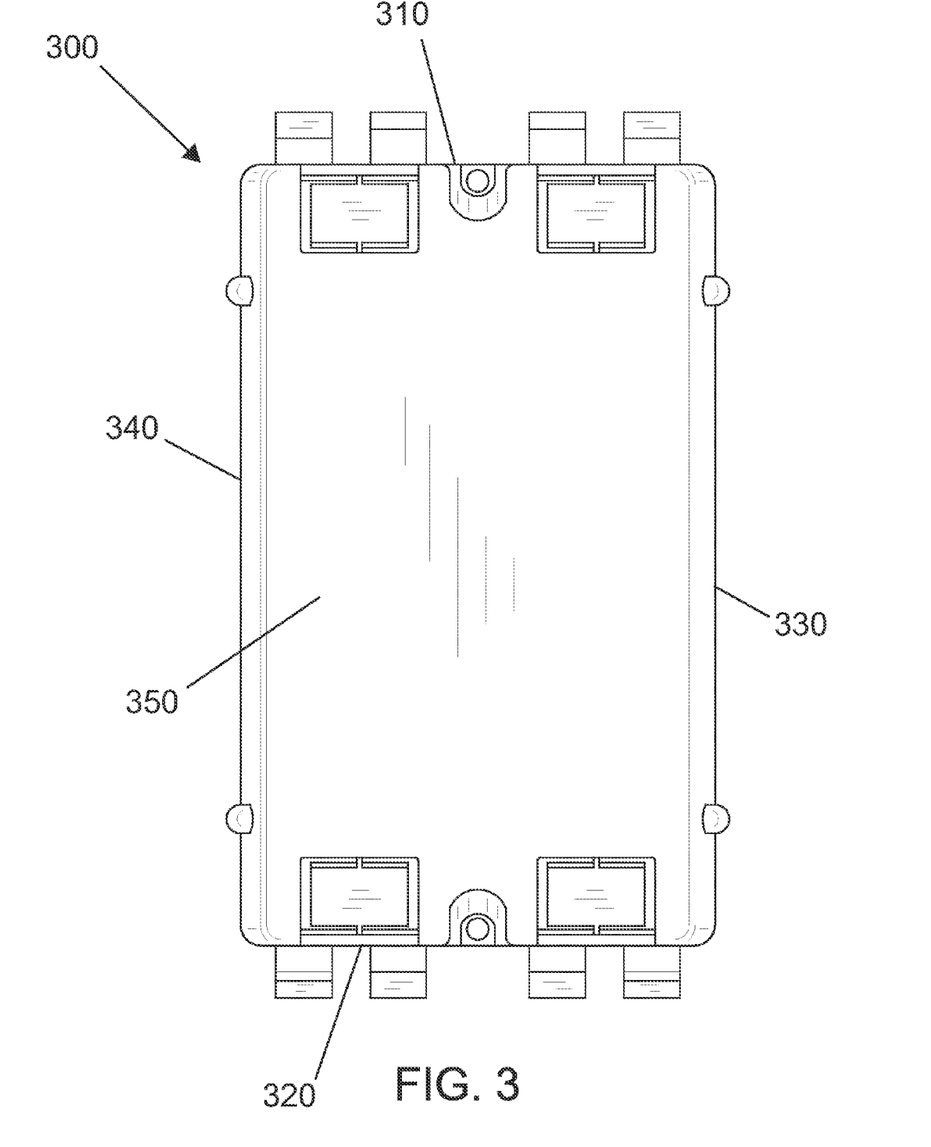
FIG. 3 is a rear view of the electrical box of the present invention.
Figure 4:
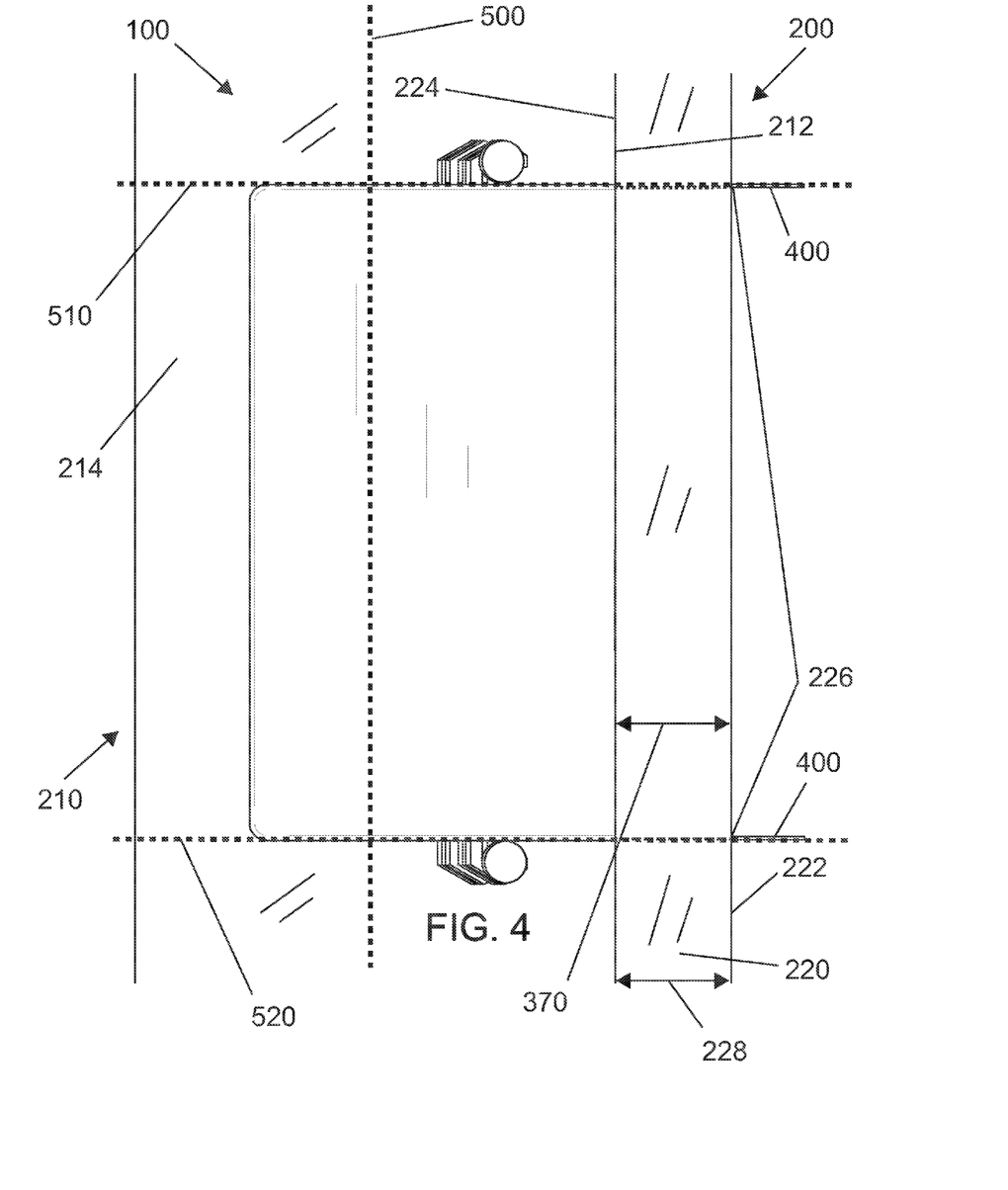
FIG. 4 is a side view of the present invention.
Figure 5:
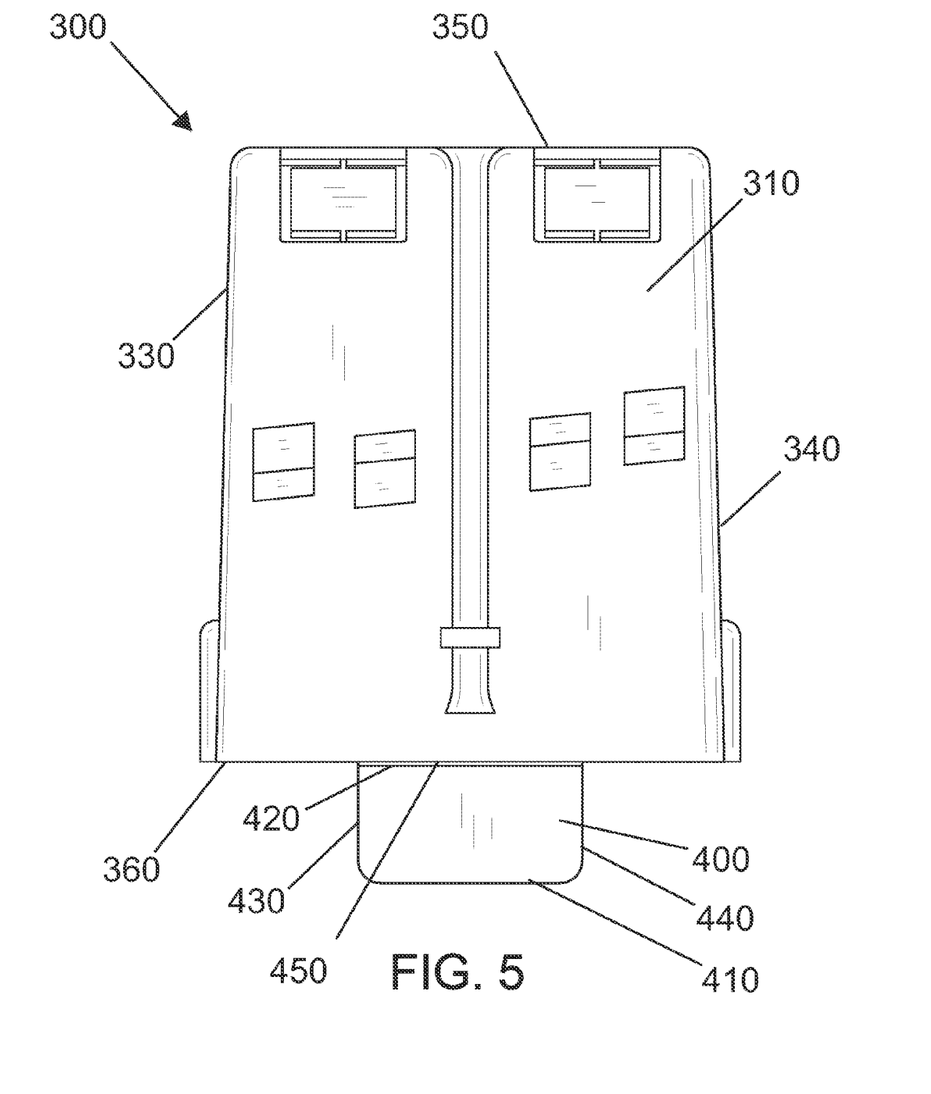
FIG. 5 is a top view of the electrical box of the present invention.

Following is a list of elements corresponding to a particular element referred to herein:

100 Electrical box marking system
200 Structural wall
210 Stud
212 Stud face
214 Stud side
220 Sheet of drywall
222 Front drywall surface
224 Rear drywall surface
226 Drywall aperture
228 Drywall thickness
300 Electrical box
310 Box top side
320 Box bottom side
330 Box first side
340 Box second side
350 Box rear side
360 Box front side
362 Box top lip
364 Box bottom lip
366 Box first side lip
368 Box second side lip
370 Box projection distance
400 Projection
410 Projection front edge
420 Projection rear edge
430 Projection first side edge
440 Projection second side edge
450 Scored line
500 Plane A
510 Plane B
520 Plane C Referring now to FIG. 1-5, the present invention features an electrical box marking system (100) for use when installing a sheet of drywall over a mounted electrical box or masking the electrical box for texturing or painting the sheet of drywall. In some embodiments, the system (100) comprises a structural wall (200) having a stud (210) longitudinally located therein on a Plane A (500) parallel to a plumb line. In some embodiments, the stud (210) comprises a stud face (212) and a stud side (214).

In some embodiments, the system (100) comprises an electrical box (300) located on the stud side (214) having a box top side (310), an opposing box bottom side (320), a box first side (330), an opposing box second side (340), a box rear side (350) and an opposing open box front side (360). In some embodiments, the open box front side (360) comprises a box top lip (362), a box bottom lip (364), a box first side lip (366), and a box second side lip (368).

In some embodiments, a first projection (400) is located on the box top lip (362). In some embodiments, the first projection (400) comprises a first projection rear edge (420) centrally located contiguously on the box top lip (362). In some embodiments, the first projection (400) and the box top side (310) lie on a Plane B (510). In some embodiments, the first projection (400) comprises a first scored line (450) located at the interface of the box top lip (362) and the first projection rear edge (420).

In some embodiments, a second projection (400) is located on the box bottom lip (364). In some embodiments, the second projection (400) comprises a second projection rear edge (420) centrally located contiguously on the box bottom lip (364). In some embodiments, the second projection (400) and the box bottom side (320) lie on a Plane C (520). In some embodiments, the second projection (400) comprises a second scored line (450) located at the interface of the box bottom lip (364) and the projection rear edge (420).

In some embodiments, the box first side (330) or the box second side (340) is located on the stud side (214). In some embodiments, the box top lip (362), the box bottom lip (364), the box first side lip (366), and the box second side lip (368) project out and away from the stud face (212) by a box projection distance (370).

In some embodiments, the system (100) comprises a sheet of drywall (220) having a front drywall surface (222), a rear drywall surface (224), and a drywall thickness (228).

In some embodiments, for installation, a location of the electrical box (300) is marked on the sheet of drywall (220). In some embodiments, the sheet of drywall (220) is located on the structural wall (200) via fastening the rear drywall surface (224) on to the stud face (212). In some embodiments, the first projection (400) and the second projection (400) are located against and push against the rear drywall surface (224) creating a bow in the sheet of drywall (220). In some embodiments, a spiral saw is used to cut around the projecting electrical box (300) to create a drywall aperture (226). In some embodiments, the drywall aperture (226) fits around the electrical box (300) eliminating the bow in the sheet of drywall (220). In some embodiments, the box top lip (362), the box bottom lip (364), the box first side lip (366), and the box second side lip (368) are located flush with the front drywall surface (222). In some embodiments, the first projection (400) and the second projection (400) is snapped off or cut off at the first scored line (450) and the second scored line (450) respectively.

In some embodiments, for masking the electrical box (300) for texturing or painting the sheet of drywall (220), masking tape is placed over the electrical box (300) and attached to the box top lip (362), the box bottom lip (364), the box first side lip (366), and the box second side lip (368). In some embodiments, the First projection (400) and the second projection (400) protrude through the masking tape. In some embodiments, upon completion of texturing or painting the sheet of drywall (220), the masking tape is removed. In some embodiments, the first projection (400) and the second projection (400) are snapped off or cut off at the first scored line (450) and the second scored line (450) respectively.

In some embodiments, the projection (400) comprises a width of about 1 inch from a projection first side edge (430) to a projection second side edge (440). In some embodiments, the projection (400) comprises a depth of about ½ inch from a projection front edge (410) to the projection rear edge (420).

In some embodiments, the projection (400) comprises a tapered projection front edge (410). In some embodiments, the projection (400) comprises a shape of an arrow tip. In some embodiments, the projection (400) comprises a curved projection front edge (410). In some embodiments, the projection (400) comprises a shape of a semicircle.

In some embodiments, the drywall aperture (226) is generally rectangular having a width comprising about 2¼ inches and a height comprising about 3¾ inches.

In some embodiments, the drywall thickness (228) is equal to the box projection distance (370).

In some embodiments, a method for installing a sheet of drywall over a mounted electrical box comprises obtaining a structural wall (200), an electrical box (300), and a sheet of drywall (220) as described in the above described electrical box marking system (100). In some embodiments, the method comprises marking a location of the electrical box (300) on a sheet of drywall (220). In some embodiments, the method comprises attaching the sheet of drywall (220) on the structural wall (200) via fastening the rear drywall surface (224) on the stud face (212). In some embodiments, the first projection (400) and the second projection (400) are located against and push against the rear drywall surface (224) creating a bow in the sheet of drywall (220). In some embodiments, the method comprises cutting around the projecting electrical box (300) to create a drywall aperture (226) using a spiral saw. In some embodiments, the drywall aperture (226) fits around the electrical box (300) eliminating the bow in the sheet of drywall (220). In some embodiments, the box top lip (362), the box bottom lip (364), the box first side lip (366), and the box second side lip (368) are located flush with the front drywall surface (222). In some embodiments, the method comprises snapping or cutting the first projection (400) and the second projection (400) off at the first scored line (450) and the second scored line (450) respectively.

In some embodiments, a method for masking the electrical box for texturing or painting the sheet of drywall comprises obtaining a structural wall (200), an electrical box (300), and a sheet of drywall (220) as described in the above described electrical box marking system (100). In some embodiments, the method comprises marking a location of the electrical box (300) on a sheet of drywall (220). In some embodiments, the method comprises attaching the sheet of drywall (220) on the structural wall (200) via fastening the rear drywall surface (224) on the stud face (212). In some embodiments, the first projection (400) and the second projection (400) are located against and push against the rear drywall surface (224) creating a bow in the sheet of drywall (220). In some embodiments, the method comprises cutting around the projecting electrical box (300) to create a drywall aperture (226) using a spiral saw. In some embodiments, the drywall aperture (226) fits around the electrical box (300) eliminating the bow in the sheet of drywall (220). In some embodiments, the box top lip (362), the box bottom lip (364), the box first side lip (366), and the box second side lip (368) are located flush with the front drywall surface (222). In some embodiments, the method comprises placing masking tape over the electrical box (300) and attaching the masking tape to the box top lip (362), the box bottom lip (364), the box first side lip (366), and the box second side lip (368). In some embodiments, the First projection (400) and the second projection (400) protrude through the masking tape. In some embodiments, the method comprises removing the masking tape upon completion of texturing or painting the sheet of drywall (220). In some embodiments, the method comprises snapping or cutting the first projection (400) and the second projection (400) off at the first scored line (450) and the second scored line (450) respectively.

In some embodiments, the present invention features an electrical box marking system (100) for use when masking an electrical box (300) for texturing or painting drywall. In some embodiments, the system (100) comprises a structural wall (200) having a linear stud (210) longitudinally located therein on a plane, Plane A (500), parallel to a plumb line. In some embodiments, the linear stud (210) is vertical. In some embodiments, the stud comprises a stud face (212) and a stud side (214). In some embodiments, the structural wall (200) further comprises a sheet of drywall (220) having a front drywall surface (222) and a rear drywall surface (224). In some embodiments, the rear drywall surface (224) is located on the stud face (212). In some embodiments, the sheet of drywall (220) further comprises a drywall aperture (226) located through a cross-section thereof fluidly connecting the front drywall surface (222) to the rear drywall surface (224). In some embodiments, the drywall aperture (226) is generally rectangular having a width comprising about 2¼ inches and a height comprising about 3¾ inches.

In some embodiments, the system (100) comprises an electrical box (300) located in the drywall aperture (226) having a box top side (310), an opposing box bottom side (320), a box first side (330), an opposing box second side (340), a box rear side (350) and an opposing open box front side (360). In sonic embodiments, the box first side (330) or the box second side (340) is located on a stud side (214).

In some embodiments, the box top side (310) is located on the box first side (330) and the box second side (340) via a plurality of edges. In some embodiments, the box bottom side (320) is located on the box first side (330) and the box second side (340) via a plurality of edges. In some embodiments, the box rear side (350) is located on the box first side (330), the box second side (340), the box top side (310), and the box bottom side (320) via a plurality of edges. In some embodiments, the open box front side (360) comprises a box top lip (362), a box bottom lip (364), a box first side lip (366), and a box second side lip (368). In some embodiments, the box top lip (362), the box bottom lip (364), the box first side lip (366), and the box second side lip (368) are located flush with the front drywall surface (222) upon installation.

In some embodiments, a first projection (400) is located on the box top lip (362). In some embodiments, the first projection (400) comprises a projection rear edge (420). In some embodiments, the projection rear edge (420) is centrally located contiguously on the box top lip (362). In some embodiments, the first projection (400) comprises a scored line (450) located at the interface of the box top lip (362) and the projection rear edge (420) for easy removal of the first projection (400).

In some embodiments, a second projection (400) is located on the box bottom lip (364). In some embodiments, the second projection (400) comprises a projection rear edge (420). In some embodiments, the projection rear edge (420) is centrally located contiguously on the box bottom lip (364). In some embodiments, the second projection (400) comprises a scored line (450) located at the interface of the box bottom lip (364) and the projection rear edge (420) for easy removal of the second projection (400).

In some embodiments, for use, the projection (400) is snapped off or cut off at the scored line (450).

In some embodiments, the projection (400) comprises a width of about 1 inch from a projection first side edge (430) to a projection second side edge (440). In some embodiments, the projection (400) comprises a depth of about ½ inch from a projection front edge (410) to the projection rear edge (420).

In some embodiments, the projection (400) comprises a tapered projection front edge (410). In some embodiments, the projection (400) comprises a shape of an arrow tip.

In some embodiments, the projection (400) comprises a curved projection front edge (410). In some embodiments, the projection (400) comprises a shape of a semicircle.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method for installing a sheet of drywall over a mounted electrical box, wherein the method comprises:

(a) obtaining a structural wall (200) having a stud (210) longitudinally disposed therein on a Plane A (500), parallel to a plumb line, wherein the stud (210) comprises a stud face (212) and a stud side (214); an electrical box (300) disposed on the stud side (214) having a box top side (310), an opposing box bottom side (320), a box first side (330), an opposing box second side (340), a box rear side (350) and an opposing open box front side (360), wherein the open box front side (360) comprises a box top lip (362), a box bottom lip (364), a box first side lip (366), and a box second side lip (368), wherein a first projection (400) is disposed on the box top lip (362), wherein the first projection (400) comprises a first projection rear edge (420) centrally disposed contiguously on the box top lip (362), wherein the first projection (400) and the box top side (310) lie on a Plane B (510), wherein the first projection (400) comprises a first scored line (450) disposed at the interface of the box top lip (362) and the first projection rear edge (420), wherein a second projection (400) is disposed on the box bottom lip (364), wherein the second projection (400) comprises a second projection rear edge (420) centrally disposed contiguously on the box bottom lip (364), wherein the second projection (400) and the box bottom side (320) lie on a Plane C (520), wherein the second projection (400) comprises a second scored line (450) disposed at the interface of the box bottom lip (364) and the projection rear edge (420), wherein the box first side (330) or the box second side (340) is disposed the stud side (214), wherein the box top lip (362), the box bottom lip (364), the box first side lip (366), and the box second side lip (368) project out and away from the stud face (212) by a box projection distance (370); and a sheet of drywall (220) having a front drywall surface (222), a rear drywall surface (224), and a drywall thickness (228);
(b) marking a location of the electrical box (300) on the sheet of drywall (220);
(c) attaching the sheet of drywall (220) on the structural wall (200) via fastening the rear drywall surface (224) on the stud face (212), wherein the first projection (400) and the second projection (400) are disposed against and push against the rear drywall surface (224) creating a bow in the sheet of drywall (220);
(d) cutting around the projecting electrical box (300) to create a drywall aperture (226) using a spiral saw, wherein the drywall aperture (226) fits around the electrical box (300) eliminating the bow in the sheet of drywall (220), wherein the box top lip (362), the box bottom lip (364), the box first side lip (366), and the box second side lip (368) are disposed flush with the front drywall surface (222); and
(e) snapping or cutting the first projection (400) and the second projection (400) off at the first scored line (450) and the second scored line (450) respectively.

2. A method for masking the electrical box for texturing or painting the sheet of drywall, wherein the method comprises:
(a) obtaining a structural wall (200) having a stud (210) longitudinally disposed therein on a Plane A (500), parallel to a plumb line, wherein the stud (210) comprises a stud face (212) and a stud side (214); an electrical box (300) disposed on the stud side (214) having a box top side (310), an opposing box bottom side (320), a box first side (330), an opposing box second side (340), a box rear side (350) and an opposing open box front side (360), wherein the open box front side (360) comprises a box top lip (362), a box bottom lip (364), a box first side lip (366), and a box second side lip (368), wherein a first projection (400) is disposed on the box top lip (362), wherein the first projection (400) comprises a first projection rear edge (420) centrally disposed contiguously on the box top lip (362), wherein the first projection (400) and the box top side (310) lie on a Plane B (510), wherein the first projection (400) comprises a first scored line (450) disposed at the interface of the box top lip (362) and the first projection rear edge (420), wherein a second projection (400) is disposed on the box bottom lip (364), wherein the second projection (400) comprises a second projection rear edge (420) centrally disposed contiguously on the box bottom lip (364), wherein the second projection (400) and the box bottom side (320) lie on a Plane C (520), wherein the second projection (400) comprises a second scored line (450) disposed at the interface of the box bottom lip (364) and the projection rear edge (420), wherein the box first side (330) or the box second side (340) is disposed the stud side (214), wherein the box top lip (362), the box bottom lip (364), the box first side lip (366), and the box second side lip (368) project out and away from the stud face (212) by a box projection distance (370); and a sheet of drywall (220) having a front drywall surface (222), a rear drywall surface (224), and a drywall thickness (228);
(b) marking a location of the electrical box (300) on the sheet of drywall (220);
(c) attaching the sheet of drywall (220) on the structural wall (200) via fastening the rear drywall surface (224) on the stud face (212), wherein the first projection (400) and the second projection (400) are disposed against and push against the rear drywall surface (224) creating a bow in the sheet of drywall (220);
(d) cutting around the projecting electrical box (300) to create a drywall aperture (226) using a spiral saw, wherein the drywall aperture (226) fits around the electrical box (300) eliminating the bow in the sheet of drywall (220), wherein the box top lip (362), the box bottom lip (364), the box first side lip (366), and the box second side lip (368) are disposed flush with the front drywall surface (222);
(e) placing masking tape over the electrical box (300) and attaching the masking tape to the box top lip (362), the box bottom lip (364), the box first side lip (366), and the box second side lip (368), wherein the first projection (400) and the second projection (400) protrude through the masking tape;
(f) removing the masking tape upon completion of texturing or painting the sheet of drywall (220); and
(g) snapping or cutting the first projection (400) and the second projection (400) off at the first scored line (450) and the second scored line (450) respectively.

* * * * *